TELEPHONE LOCKOUT RELAY CONTROL CIRCUIT

Filed Oct. 10, 1946

Inventors.
Kenneth R. Sterrett
Donald S. Baker.
By Brown, Jackson, Boettcher & Dienner
Attys.

UNITED STATES PATENT OFFICE 2,525,840

TELEPHONE LOCKOUT RELAY CONTROL CIRCUIT

Kenneth R. Sterrett, Galion, and Donald S. Baker, Iberia, Ohio, assignors to The North Electric Manufacturing Company, Galion, Ohio, a corporation of Ohio Application October 10, 1946, Serial No. 702,466

4 Claims. (Cl. 179—19)

Figures 1, 2:
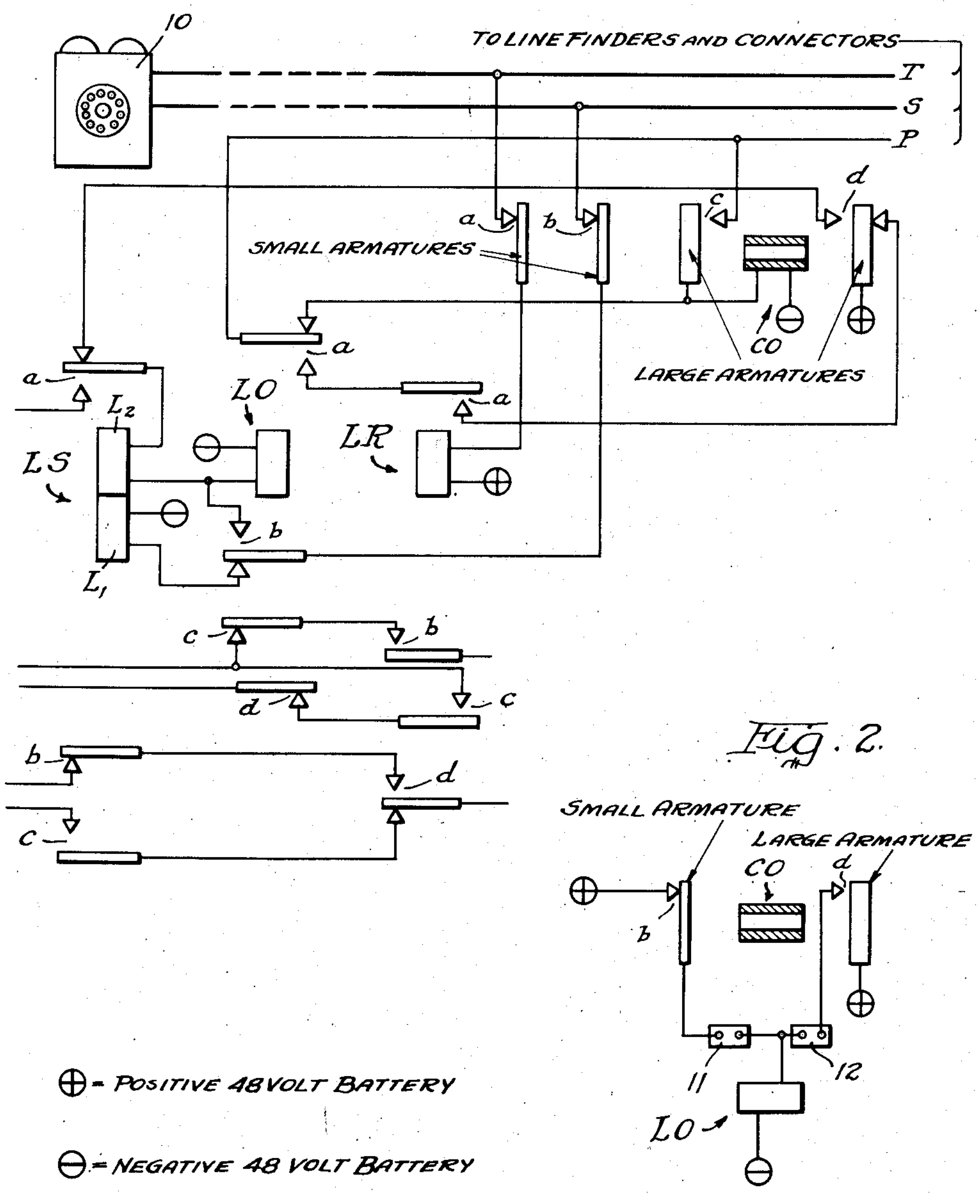

This invention relates, generally, to relay systems and it has particular relation to relay systems designed for use in automatic telephone exchanges.

In an automatic relay telephone exchange system, such as described in Chapter VI of "Telephone Theory and Practice," first edition, by Kempster B. Miller, a line relay is operated when the subscriber lifts the receiver for initiating the necessary operations to select an idle line finder link and operate the corresponding tens and units relays thereof to select the calling line. Thereupon, a cut off relay is operated to release the line relay and permit other subscribers to initiate calls.

It is desirable to limit the control that a subscriber's line may have over the telephone exchange apparatus under certain conditions. These include the time permitted for a call, the time during which a call can remain unanswered, line trouble, reverting calls, etc. For this purpose a lock out relay is operated on operation of the cut off relay and remains operated if any of these conditions exist at the time that the cut off relay returns to the normal non-operated position.

Among the objects of this invention are: To maintain continuously an energizing circuit for a winding of a relay or the like over the contacts of another relay in either the operated or non-operated position of such other relay; to employ make and break contacts operating during different time intervals and connected in parallel to maintain the desired energizing circuit; to mount the break contacts on a relatively small armature and the make contacts on a relatively large armature to effect the differential action of the contacts; to employ additional contacts to control the energizing circuit in cooperation with the break and make contacts; to energize a lock out relay in an automatic telephone exchange system on energization of the cut off relay and to maintain the lock out relay energized on deenergization of the cut off relay in the event that certain lock out conditions exist at the time; and to energize the line relay in series with the lock out relay under these conditions.

Other objects of this invention will, in part, be obvious and in part appear hereinafter.

The invention is disclosed in the embodiment thereof shown on the accompanying drawing and it comprises the features of construction, combination of elements, and arrangement of parts which will be exemplified in the construction hereinafter set forth, and the scope of the application of which will be indicated in the appended claims.

For a more complete understanding of the nature and scope of this invention reference may be had to the following detailed description and to the accompanying drawing, in which:

Figure 1 illustrates, diagrammatically, the application of the present invention to an all relay automatic telephone exchange system; and Figure 2 is a simplified diagram of certain of the circuit connections illustrated in Figure 1.

Referring now particularly to Figure 1 of the drawing, it will be observed that the reference character 10 indicates a telephone of a subscriber which is of the conventional construction and which includes the usual transmitter and receiver. The circuit to the subscriber is indicated by the conductors T and S at the telephone exchange. In addition to the conductors T and S, a start or test wire P is associated therewith and it is connected, as indicated, to the links of the line finders and connectors, as is more fully described in the text referred to hereinbefore.

As soon as the subscriber lifts the receiver a line relay LR is energized in series with a line tone relay LS. The operation of these relays initiates certain operations in the telephone exchange system which finally effect the selection of an idle line finder link and operation of the tens and units relays thereof to select the calling line. This is accomplished preferably through the use of certain guard circuits and relays which are employed to prevent any other subscriber from originating a call at the same instant. Since these features from no part of the present invention, they will not be described in further detail herein other than to indicate the particular contacts of the relays that may be employed which control these other operations.

When the calling line has been selected by the tens and units relays of a previously idle link, a cut off relay CO is operated over the P wire to deenergize the line relay LR and line tone relay LS and permit the guard circuit to accept new calls. The operation of the cut off relay CO effects the operation of a lock out relay LO which remains energized at least as long as the cut off relay remains energized and which, in accordance with the present invention, it is desired to maintain energized in the event that any of the lock out conditions, enumerated hereinbefore, exist at the time that the cut off relay CO is deenergized.

The details of construction of the relays LR, LS, CO, and LO are set forth in the co-pending application of Robert K. McBerty and Donald S. Baker, Serial No. 701,310, filed October 4, 1946, and accordingly, they will not be described herein, except in so far as is necessary for an understanding of this present invention. As set forth in this co-pending application, the relay construction embodies certain of the features disclosed and claimed in Patent No. 2,396,332 to F. R. McBerty.

It will be observed that the relays illustrated in Figure 1 are provided with contacts, either make or break or both, which are indicated by the letters *a*, *b*, *c*, etc. For example, the line relay LR is provided with make contacts *a*, *b*, and *c* and make and break contacts *d*. It will be understood that when the operating winding of the line relay LR is energized, the make contacts are closed and the break contact is opened. For present purposes consideration need be given only to make contacts *a* of line relay LR. Contacts *b*, *c*, and *d* are employed for controlling the operation of the guard circuits, etc., which form no part of the present invention.

The lock out relay LO likewise is provided with contacts *a*, *b*, *c*, and *d*. Contacts *a* and *b* are both make and break contacts while contacts *c* and *d* are break contacts which are employed for effecting certain control operations in the automatic telephone exchange apparatus having nothing to do with the present invention.

Likewise line tone relay LS has make and break contacts *a*, break contacts *b*, and make contacts *c*, the latter two having nothing to do with the present invention. The line tone relay LS is provided with an operating winding L1 and a non-operating winding L2, the latter being connected, as shown, in series with the operating winding of the lock out relay LO.

As previously indicated it is desired to maintain the energizing circuit for the operating winding of the lock out relay LO completed after deenergization of the operating winding of cut off relay CO in the event that certain lock out conditions still persist. For this purpose the cut off or transfer relay CO has contacts which afford a differential action the character of which is set forth in more detail in the co-pending application of McBerty and Baker referred to above. It will be observed that the cut off relay CO has two pairs of break contacts *a* and *b*, a pair of make contacts *c*, and a pair of make contacts *d*, with which are also associated a pair of break contacts. The movable contact of each of the break contacts *a* and *b* is operated by a relatively small armature while relatively large armatures are provided for the make contacts *c* and *d*.

The cut off relay CO is, as indicated, of the slow-to-release type which feature is provided by a copper sleeve surrounding the core of the magnetic circuit as described in the co-pending application of McBerty and Baker. By employing relatively small armatures for the break contacts *a* and *b*, and relatively large armatures for the make contacts *c* and *d*, it is possible to provide the desired differential action, particularly with respect to break contacts *a* and *b* and make contacts *d*. That is, on energization of the operating winding of the cut off relay CO the large armature associated with contacts *d* will complete a circuit through these make contacts before the circuits through the break contacts *a* and *b* are opened, and conversely, when the operating winding is deenergized the circuits through break contacts *a* and *b* will be completed before the circuit through the make contacts *d* is opened.

When the subscriber lifts the receiver, the circuit is completed between the lines T and S and the operating windings of relays LR and LS are energized in series over break contacts *a* and *b* of the cut off relay CO. The contacts of relays LR and LS are operated to initiate the functions outlined hereinbefore. After the calling line has been selected, the P wire or test-lead is energized and an energizing circuit is completed over break contacts *a* of lock out relay LO for the operating winding of the cut off relay CO. At make contacts *c* of the cut off relay CO, a holding circuit is completed. At break contacts *a* and *b* of the cut off relay CO the energizing circuit for the operating windings of relays LR and LS is opened. They are deenergized and the contacts are operated correspondingly.

Lock out relay LO now is initially energized over break contacts *a* of relay LS and make contacts *d* of relay CO.

In the event that the subscriber completes the call within the time permitted and replaces the receiver, the P wire is deenergized and the cut off relay CO is returned to the normal non-operated position. Likewise lock out relay LO is returned to the non-operated position when make contacts *d* of cut off relay CO open.

However, assuming that one of the above enumerated lock out conditions exists, such as the call remaining unanswered beyond a predetermined time, the subscriber will have the receiver lifted. At the end of this time, the P wire is automatically deenergized, and the cut off relay CO is restored to the normal non-operated position. It is desired to maintain the operating winding of the lock out relay LO energized now so that it may perform its lock out function.

It will be recalled that the operating winding of lock out relay LO was energized in series with non-operating winding L2 of relay LS through make contacts *d* of the cut off relay CO. Now, when the operating winding of relay CO is deenergized, because of the differential action between the armatures associated with break contacts *a* and *b* and the armature associated with make contacts *d*, break contacts *a* and *b* are completed before make contacts *d* are opened. Since the lock out relay LO already is in the operated position, its make contacts *b* are closed and its operating winding is energized in series with the operating winding of line relay LR over a holding circuit comprising break contacts *a* and *b* of the cut off relay CO and line wires T and S. At contacts *a* of line relay LR an obvious circuit is completed which energizes the P wire so that it will test "busy" to incoming calls.

So long as the subscriber keeps the receiver lifted, the lock out relay LO and the line relay LR will remain operated. As soon as the receiver is restored, the energizing circuit for the operating winding of these relays is opened and they are restored to their non-operated positions.

In Figure 2 of the drawing there is shown a simplified arrangement of the circuits for controlling the energization of the operating winding of lock out relay LO. It will be noted that only break contacts *b* and make contacts *d* of the cut off relay CO are illustrated here. Further it will be noted that these contacts are connected in separate energizing circuits for the lock out relay and, since they have the differential action previously described, the cut off relay CO at its contacts *b* and *d* maintains closed the portion of either of the first or the second energizing circuits controlled thereby.

The energizing circuit for one operating winding of lock out relay LO is thus always prepared, that is, either through break contacts *b* of cut off relay CO, when its operating winding is de-energized, or through make contacts *d* when its operating winding is energized. Thus, assuming the first energizing circuit for lock out relay LO, which passes over contacts *b* of cut off relay CO, is closed at contacts 11, and assuming that the second energizing circuit is closed at contacts 12, with operation of the cut off relay to open contacts *b* and close contact *d*, because of the overlap in the operation of these contacts *b* and *d* resulting from the use of the small and large armatures, respectively, the control of the lock out relay LO may be transferred from a first energizing circuit to the second energizing circuit without effecting even instantaneous interruption of the energizing of the lock out relay LO.

It will be understood that the contacts 11 may represent the make contacts *b* of relay LO, while the contacts 12 may correspond to break contacts *a* of relay LS .

Since certain changes can be made in the foregoing relay system without departing from the spirit and scope of the present invention, it is intended that all matter shown in the accompanying drawing and described hereinbefore shall be interpreted as illustrative and not in a limiting sense.

What is claimed as new is:

1. In line equipment for use with an associated subscriber's line and substation in an automatic telephone exchange having a source of potential and switching apparatus for extending calls between associated subscriber's lines, the combination of a line relay having a pair of make contacts, a line tone relay having a pair of break contacts, a lock out relay having a first make-break contact pair and a second make-break contact pair, and a cut-off relay having time delay means associated therewith, a first and second pair of break contacts, a make-break contact pair and a pair of make contacts, said line relay and said line tone relay being arranged to be connected to said potential source in series with said associated subscriber's line and subscriber substation over said first and second pair of break contacts of said cut off relay and the break contacts of the first make-break set of said lock out relay responsive to a call initiating operation at said substation, a test lead for connecting said cut off relay to said switching apparatus over the break contacts of the second make-break set of said lock out relay, said cut off relay being arranged to be energized responsive to receipt of a signal over said test lead with transmission of a call to a certain point in the exchange and to be maintained operated thereby for the duration of the call, said cut off relay being operative, on energization, at its break contacts to interrupt the energizing circuit for said line relay and line tone relay LS to release same, an initial energizing circuit for said lock out relay comprising said source of potential, the break contacts of said line tone relay and the make contacts of said cut off relay, said lock out relay being adapted to be energized thereover responsive to said energization of said cut off relay and said release of said line tone relay; said cut off relay being arranged to be de-energized responsive to receipt of a predetermined signal over said test lead, a holding circuit for said lock out relay comprising said source of potential, said line relay, said substation, said subscriber's line, said first and second pair of cut off relay break contacts and said make contacts of said first make-break set for said lock out relay, said cut off relay having armatures of a relatively small size for controlling said first and second pair of break contacts and armatures of a relatively larger size for controlling said make and said make-break contact sets therefor, said armature sizes being proportioned relative to each other to effect, with said time delay means, on de-energization of said cut off relay, the completion of the movement of said smaller armatures prior to initiation of movement of said larger armatures, whereby said cut off relay is operative, responsive to receipt of said signal prior to restoration of said substation, to control said first and second pair of break contacts to complete said holding circuit for said lock out relay prior to operation of said make contact of said make-break set to interrupt the initial energizing circuit for said lock out relay, so that control of said lock out relay is thus transferred from said initial energizing circuit to said holding circuit without interrupting the supply of electrical energy thereto.

2. In line equipment for use with an associated subscriber's line and subscriber's substation in an automatic exchange having a source of potential and switching apparatus, the combination of a line relay, a line tone relay, a lock out relay having a pair of make contacts and a cut off relay having at least a first pair of break contacts, a second pair of break contacts and a pair of make contacts, a series energizing circuit for said line relay and said line tone relay extending from said source and over said subscriber's line, said subscriber's substation and said first and second sets of cut off relay break contacts, said series circuit being arranged to be initially energized responsive to a call initiating operation at said substation; an initial energizing circuit for said lock out relay including said cut off relay make contacts, a test lead for transmitting energizing signals to said cut off relay responsive to extension of a call to said switching apparatus, said cut off relay responsively effecting operation of said first and second break contacts to interrupt said series circuit and operation of said cut off relay make contacts to complete a point in said lock out relay energizing circuit, said line relay and line tone relay responsively operated to restore, means controlled by said line tone relay in restoration to complete said lock out relay energizing circuit; a holding circuit for said lock out relay extending over said cut off relay break contacts and said lock out relay make contacts, said cut off relay having a first and second armature for controlling said first and second break contacts, which armatures are of a predetermined size for effecting a given operating period therefore, and a third armature which is of a different predetermined size and which is proportioned relative to said first and second armature to effect, on relay energization, an operating period in which movement of said third armature is completed prior to operation of said first and second armatures; and time delay means for effecting, with said size differentials, responsive to relay de-energization, a period of delay prior to initiation of movement of said third armature which is of sufficient length to permit said first and second armature to complete their restoring movement, whereby said cut off relay is operative, on de-energization, responsive to receipt of said signal prior to a restoring operation at said substation, to energize said holding circuit for said lock out relay prior to interruption of said lock out energizing circuit.

3. In a telephone system having a source of electrical energy, a lock out relay, an initial energizing circuit and a holding circuit therefor, a cut off relay, means including a test lead for effecting energization of said cut off relay on extension of a call to a given point in the system, and for normally effecting de-energization of said cut off relay on completion of the call, a first armature for said cut off relay, magnetizing means on said relay for controlling operation of said armature in accordance with said relay energization and de-energization, means including a first set of contacts arranged to be operated by said first cut off relay armature with energization of said cut off relay to complete said initial energizing circuit for said lock out relay, a holding circuit for said lock out relay including a second set of contacts on said cut off relay, and means controlled by said cut off relay for transferring the control of said lock out relay from said initial energizing circuit to said holding circuit responsive to receipt of a signal over said test lead prior to termination of the call by the subscriber, said means comprising a second armature on said cut off relay controlled to operate by said magnetizing means, said second armature having an effective surface area which is proportioned in size to intersect a smaller number of lines of flux of said magnetizing means than said first armature, and time delay means which is effective with said armature differential sizes to delay operation of said larger armature on de-energization of said relay until said smaller armature has completed its movement, whereby said holding circuit is closed prior to opening of said initial energizing circuit to effect transfer of lock out relay control from the one circuit to the other without interrupting the supply of energy to the lock out relay.

4. In a relay control system having a source of electrical energy, a controlled switching device, a first and a second energizing circuit for said device, a transfer relay having two conditions of operation, circuit control means for alternatively imposing one of said two conditions of operation on said transfer relay, a first armature for said relay, and magnetizing means for producing lines of flux to operate said armature in accordance with the particular condition imposed thereon, said armature having a predetermined size to intersect a predetermined number of lines of flux of said magnetizing means to effect a given operating period therefor, a first set of contacts connected in said first energizing circuit and arranged to be controlled by said first armature, circuit means, including said first armature and contacts, operated responsive to imposition of said one condition on said transfer relay for initially energizing said device from said source over said first energizing circuit, and circuit transfer means for transferring the control of said switching device from said one circuit to said second circuit without interrupting the supply of energy to said switching device, responsive to imposition of said other condition on said transfer relay; said transfer means comprising time delay means for said transfer relay, a second set of contacts connected in the other of said energizing circuits and a second armature for controlling said second contacts to close with imposition of said second condition on said relay, said second armature being proportioned to a predetermined size to intersect a predetermined number of lines of flux of said magnetizing means which is different in value than that intersected by said first armature to effect with said time delay means a predetermined operating time differential between said armatures, said predetermined operating differential comprising, on imposition of said second condition, completion of movement of said second armature to close said second contacts prior to initiation of movement of said first armature to open said first contacts.

KENNETH R. STERRETT.
DONALD S. BAKER.

REFERENCES CITED

The following references are of record in the file of this patent:

UNITED STATES PATENTS

| Number | Name | Date |
|---|---|---|
| 1,811,858 | Miller | June 30, 1931 |